United States Patent
Mead

(10) Patent No.: US 6,683,993 B1
(45) Date of Patent: Jan. 27, 2004

(54) ENCODING AND DECODING WITH SUPER COMPRESSION A VIA A PRIORI GENERIC OBJECTS

(75) Inventor: Donald C. Mead, Carlsbad, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 08/745,587

(22) Filed: Nov. 8, 1996

(51) Int. Cl.[7] .............................. G06K 9/36; G06K 9/38; G06K 9/46
(52) U.S. Cl. ..................... 382/253; 382/243; 382/239
(58) Field of Search .................................. 382/190, 243, 382/248, 246, 232, 236, 239, 253; 375/240.22

(56) References Cited

U.S. PATENT DOCUMENTS

| | | | | |
|---|---|---|---|---|
| 4,606,069 A | * | 8/1986 | Johnsen | 382/243 |
| 4,783,841 A | * | 11/1988 | Crayson | 382/243 |
| 4,901,363 A | * | 2/1990 | Toyokawa | 382/239 |
| 4,922,545 A | * | 5/1990 | Endoh et al. | 382/243 |
| 5,157,743 A | * | 10/1992 | Maeda et al. | 382/248 |
| 5,592,227 A | * | 1/1997 | Feng | 348/418 |
| 5,592,228 A | * | 1/1997 | Dachiku et al. | 348/416 |
| 6,088,484 A | * | 7/2000 | Mead | 382/232 |

* cited by examiner

Primary Examiner—Timothy M. Johnson
(74) Attorney, Agent, or Firm—John A. Crook; Michael W. Sales

(57) ABSTRACT

A method and apparatus for transferring a data signal includes a transmitter having an encoder and a receiver having a decoder. The encoder includes a segment selector for identifying a signal segment from a group of speech, audio, video and graphic signals, each selected segment comprising a representation of an information quantity. The encoder includes a plurality of encoder libraries, one of the libraries containing a generic representation corresponding to the information quantity and a symbolic code corresponding to the object. The decoder has a second plurality of libraries corresponding to the plurality of encoder libraries, and one of the decoder libraries generates the information quantity as output in response to matching of the symbolic code transmitted from the encoder.

13 Claims, 5 Drawing Sheets

ENCODING AND DECODING WITH SUPER COMPRESSION A VIA A PRIORI GENERIC OBJECTS

TECHNICAL FIELD

The present invention relates generally to methods and systems for information transmission with digital signal processing including encoding and decoding signals representing aural or visual communication with an object library.

BACKGROUND OF THE INVENTION

Data compression systems reduce the number of bits needed to transmit and store a digital information signal. As a result, a lower bandwidth communication channel can be employed to transmit a compressed video signal in comparison to an uncompressed video signal. Similarly, a similar, reduced capacity storage device, which can comprise a memory or a magnetic storage medium, can be used for storing the compressed video signal. A general information signal compression system includes an encoder, which converts the video signal into a compressed signal, and a decoder, which reconstructs the video signal based upon the compressed signal.

In the design of a video compression system, an objective is to reduce the number of bits needed to represent the video signal while preserving its information content. Prior methods and systems are based upon directly compressing a waveform representation of the video signal. An alternative compression format utilizes a limited collection of predetermined library objects that symbolically represent waveform portions in a reduced amount of bits. However, the previously known compression formats are accessible only in response to receipt of an appropriate signal.

SUMMARY OF THE INVENTION

The need exists for a compression system which significantly reduces the number of bits needed to transmit and store an information signal, regardless of its content, while preserving the content integrity of the signal. In general, the transmission system of the present invention includes an encoder and decoder that contain corresponding stored digital libraries of speech, music, video, or graphic waveforms. The transmitter only has to send a symbolic representation of the desired object to the transmitter. As a result, the present invention significantly reduces the bit rate needed to transmit, or the bit capacity of a storage device to store, a signal, and significantly reduces the bandwidth of the transmission signal needed to communicate the content.

The present invention also provides symbolic encoding and decoding of speech or music signals representing aural messages or video and graphic signals representing visual content. The present invention also provides a system for encoding an information signal that contains aural or visual signal content components or information quantities, into a bit stream, and reproducing a substantial portion by symbolic codes transmission. An object encoder assigns a symbolic code to an object contained in its library. The symbolic code identifies a corresponding object from a set of generic objects, and information other than that matching objects can be coded by conventional means. A multiplexer provides the bit stream based upon the conventional coded bit stream and the symbolic codes.

The present invention provides a system for encoding a video signal into a bit stream, wherein the transmitted signal is representative of at least one of an object of speech, audio, video and graphic objects. An image segmenter segments each frame of the input into a plurality of objects. A feature extractor, coupled to the image segmenter, forms at least one information feature quantity for each of the objects. A classifier, coupled to the feature extractor and to a first storage device containing a set of generic objects in a library, recognizes at least one of the objects as matching a corresponding library object having the at least one feature quantity. A symbolic code for this object of that segment, and coded remaining information, are multiplexed and transmitted to a receiver.

When the segment includes video image components, a motion estimator can provide a motion compensation signal based upon the motion of at least one of the objects from a first frame to a second frame. A multiplexer then provides the bit stream based upon the symbolic code, the remaining signal, and the motion compensation signal. Nevertheless, the present invention provides methods of encoding and decoding speech, audio, graphic or video signal components into a bit stream.

The present invention also provides a method and a system for reconstructing an object and other information in the segment from a bit stream representative of segment signals. In a receiver, a demultiplexer extracts Variable Length Codes (VLC) representing the symbolic code and the conventionally coded signal from the encoded video signal. The symbolic code identifies a corresponding object from set of a library objects. An object generator contributes to the output signal by generating the corresponding object waveform identified by the symbolic code.

BRIEF DESCRIPTION OF THE DRAWINGS

The present invention will be better understood by reference to the following detailed description of a preferred embodiment when read in conjunction with the accompanying drawings, in which like reference characters refer to like parts throughout the views, and in which.

BEST MODES FOR CARRYING OUT THE INVENTION

Figure 1:
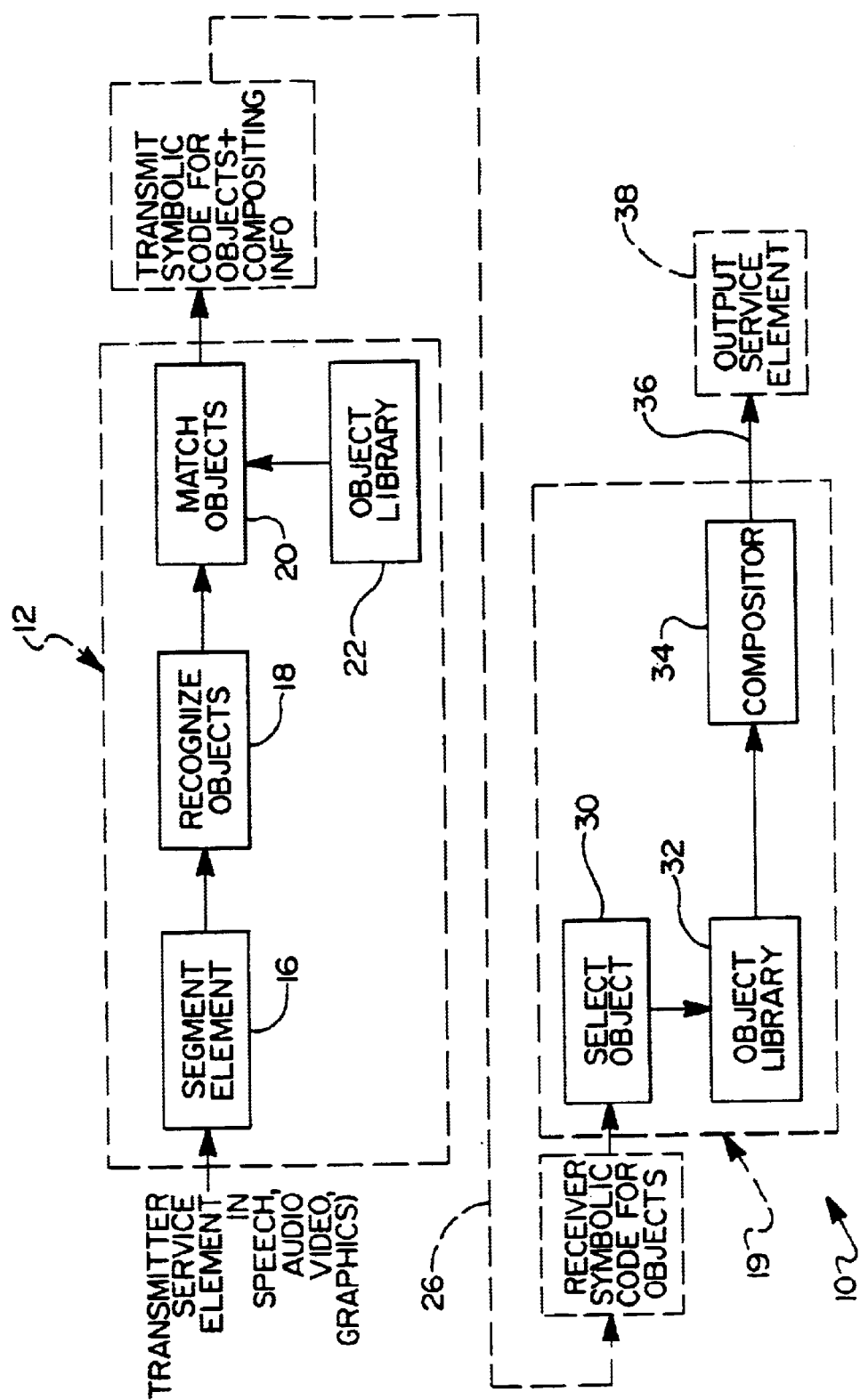
FIG. 1 is a block diagram of an embodiment of a signal transmission system including an encoder and a decoder in accordance with the present invention.

Referring first to FIG. 1, a communication system combines a transmitter 11 having an encoder 12 and a receiver 13 including a decoder 14. The encoder portion recognizes objects within an information or data signal regardless of content including aural content representative signals for speech or audio, or visual content representative signals for graphics or a video image, and then classify the objects with symbolic identifiers.

As illustrated by the block diagram in FIG. 1, the encoder 12 provides a system for encoding a signal into a bit stream for transmission to a corresponding decoder 14. A signal can be a speech signal, an audio signal representing musical content, a video signal representative of one or more frames of video footage, or a graphical signal representation of still art.

The input signal of any type is segmented according to its type, and objects carried by the signal are recognized as shown at 18. The recognized objects are then matched with symbolic codes for the objects in an object library 22 to produce an output 24 that combines the symbolic code for each object that matches the library object and the unmatched compositing of this object. Likewise, after transmission or storage, as diagrammatically represented at 26, the symbolic codes for the objects and the compositing information are received at the decoder 14. At the decoder 14, the symbolic code for objects is used to select objects from the object library 32 and provides a representative signal of the object reconstructed from the library 32. Compositing 34 then provides an output 36 to service element 38, such as a video player, so that the decoder 14 can provide input to a receiver portion that transforms the information into audio or visual output, depending on the input.

Figure 2:
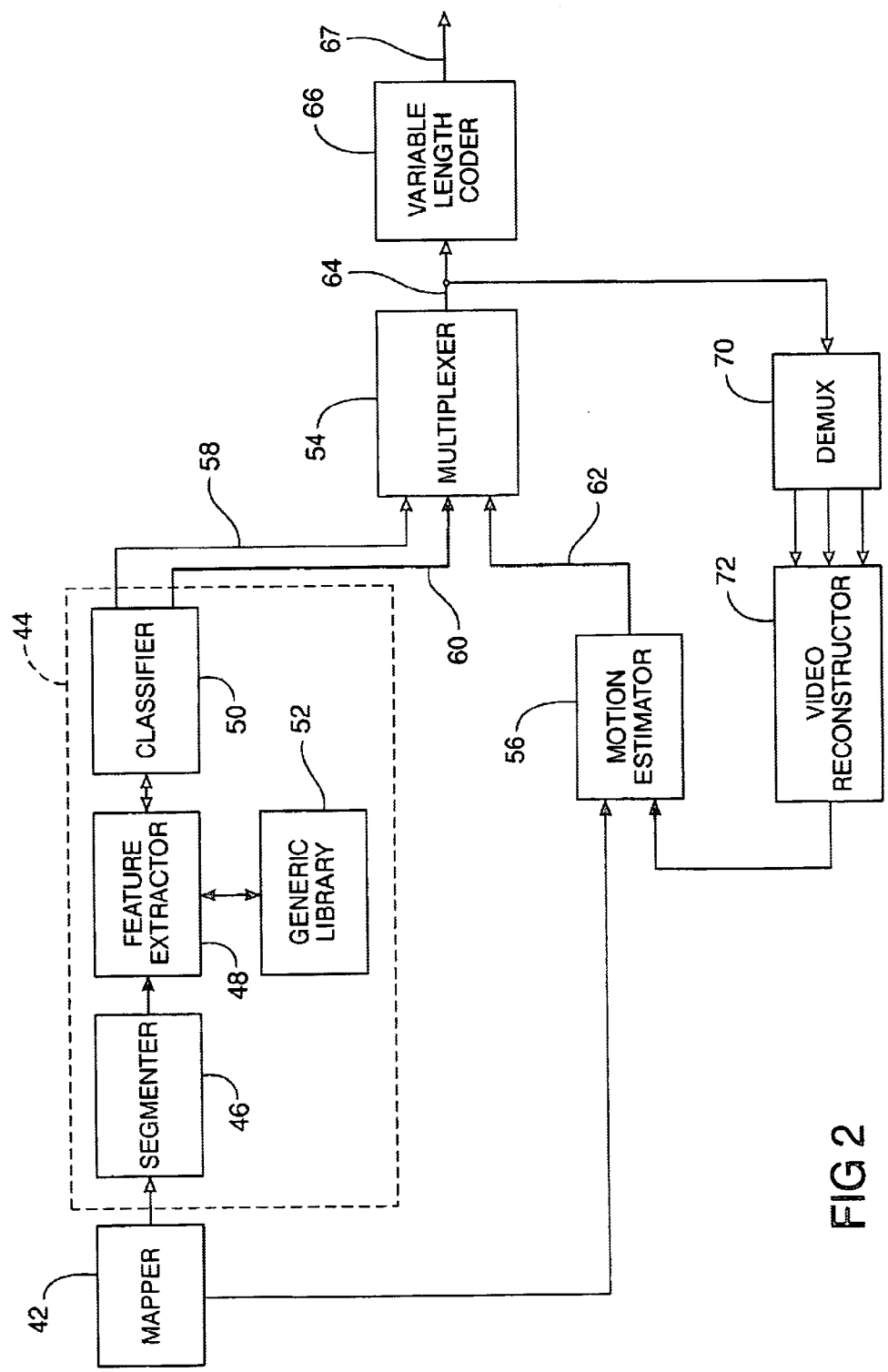
FIG. 2 is a block diagram of an encoder segment including a library with segment elements for symbolic representation of video content information in the system of FIG. 1.

Referring now to FIG. 2, one segment 40 shows a preferred embodiment for encoding and decoding video information signals in accordance with the present invention. In a preferred embodiment, a video signal is in the form of an incoming digital bit stream representative of an uncompressed digital video signal, although alternative embodiments are not limited thereto. The mapper 42 maps pixels represented by the digital bit stream into an intermediate representation conducive to effective coding. More specifically, the mapper 20 performs a transform coding operation in forming the intermediate representation. The transform coding operation produces an output signal representative of a plurality of coefficients having reduced statistical correlation. The mapper 20 can employ standard transforms such as Karhunen-Loeve, discrete cosine, Fourier, and Hadamard, to name a few, as well as nonstandard transforms as is known to persons of ordinary skill in the art.

The output of the mapper 42 is applied to an object encoder 22. The object encoder 44 extracts at least one object in the video frames, and assigns a symbolic code to each object based upon recognition of the object from a set of generic objects. The object encoder 44 includes an image segmenter 46 which subdivides an image into at least one object. For the purpose of this application, an object of an image can be representative of a constituent part of the image, a region of the image, or another entity of interest in the image. Examples of objects which are extracted by the image segmenter 46 include a human face, a hand, an arm, and a background. Various types of segmentation procedures can be employed by the image segmenter 46, as one with ordinary skill in the art of image processing will recognize.

The video segment object encoder 44 further includes a feature extractor 48, coupled to the image segmenter 46. The feature extractor 26 describes the at least one object based upon at least one feature quantity computed therefrom. In general, the feature extractor 48 reduces the representation of an object to a smaller number of components having sufficient information for discrimination therebetween. Various procedures for feature extraction can be employed by the feature extractor 48, as one with ordinary skill in the art of image processing will recognize.

Based upon the at least one feature quantity, each extracted object is compared by a classifier 50 to a set of generic objects, located in a generic library 52, for object recognition. The generic library 52, which is embodied by an electronic storage device, contains a corresponding representation for each of the generic objects. As an example, for an extracted object comprising a human head, the feature extractor 48 can extract features based upon shape and color for use by the classifier 50 in comparing to known human heads in the generic library 52. Similarly, human facial models, backgrounds and image printing that are similar to clip art can be made available in the library 52. The classifier 50 then produces the symbolic code corresponding to the closest recognized object in the generic library 52 based upon the at least one feature quantity. In the above-described example, the symbolic code for the closest recognized human head would be outputted by the object encoder 22.

In general, the object encoder 22 provides the symbolic code for each recognized object to a multiplexer 54.

An extracted object may not be recognized by any of the generic objects in the generic library 52. In this case, the classifier 50 can add any unrecognized objects to the generic library 52 to be used as references for future similar objects. In a preferred embodiment, the classifier 50 includes an expert system to perform the object recognition. The unrecognized objects are provided to the multiplexer 54 for transmission to a corresponding decoder.

The video signal may be further applied to a motion estimator 56. The motion estimator 56 performs a frame-to-frame comparison of the video signal to determine whether any objects are in motion. In a similar manner, the motion estimator 56 determines whether an originating camera which produces the video signal is panning or scanning. In this case, the entire field of view, including stationary objects, would be in motion. Based upon these determinations, the motion estimator 56 produces a motion compensation signal representative of both object motion information and camera pan and scan information. For example, if a person is waving his/her arm, the arm would be an object for which the motion estimator would compute motion information. In a preferred embodiment, the motion compensation signal is represented by a motion compensation file. Various procedures for motion estimation can be employed by the motion estimator 56, as one with ordinary skill in the art of image processing will recognize. The motion compensation signal produced by the motion estimator 56 is provided to the multiplexer 54.

The multiplexer 54 multiplexes the symbolic code 58 provided by the view segment object encoder 44, the unrecognized signal portion 60, and the motion compensation signal 62 provided by the motion estimator 56, to produce a serial bit stream representative thereof. As a result, the bit stream 64 contains information related to the generic objects represented in the video image, and motion of the objects. Further, the bit stream 64 contains coding for unrecognized objects. In a preferred embodiment, the multiplexer 54 formats the symbolic code, the motion compensation file, and appropriate synchronization information to form the bit stream. The bit stream is applied to a variable length coder 66 or a similar entropy coder, in order to further reduce the number of bits needed to represent the video signal. The variable length coded bit stream is outputted for transmission to a corresponding decoder.

The variable length coded bit stream is applied to a combination of an inverse variable length coder 68 and a demultiplexer 70. As a result, the demultiplexer 70 recovers the symbolic code, and the motion compensation file for application to a video reconstructor 72. The video reconstructor 72 reconstructs the video signal in accordance with procedure used by the corresponding decoder. The reconstructed video signal is applied to the motion estimator 56 to allow the motion compensation signal to be based thereupon.

In accordance with the present invention, the apparatus performs a method of encoding a video signal into a bit stream initiated by transform coding of the video signal. Based upon the transform coded video signal, the encoder extracts at least one object from the video image. Extracting can include segmenting the video image into one or more objects. Then the encoder computes one or more feature quantities for the at least one object. The encoder then classifies the at least one extracted object from a set of generic objects. Classifying may include comparing the one or more feature quantities to stored features of the generic objects. If classifying the object is unsuccessful, then the resulting unrecognized object may be stored in the set of generic objects as a new generic object.

For each classified object, a symbolic code is assigned representative of the closest one of the generic objects. After computing a motion signal based upon the frame-to-frame motion of the objects, the video segment encoder 44 multiplexes the symbolic code, the code for the unrecognized material and the motion signal to form the bit stream. Variable length coding of the bit stream completes the segment encoding.

Figure 3:
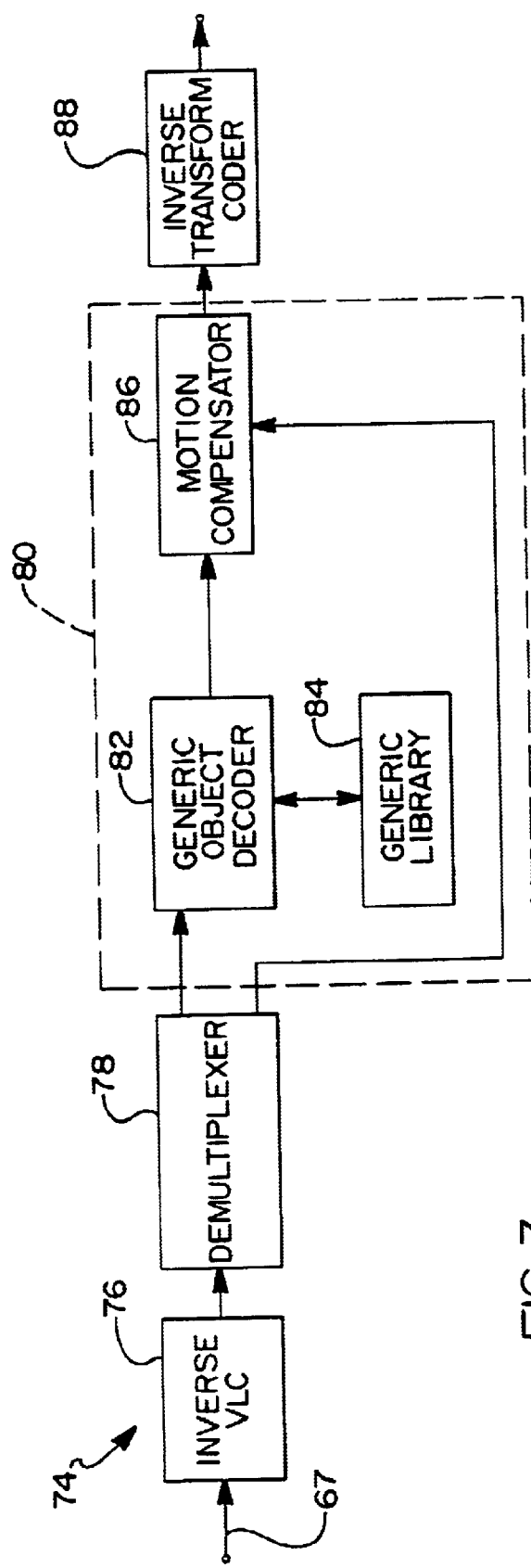
FIG. 3 is a block diagram of an embodiment of a decoder for the video content information encoded in the apparatus of FIG. 2 in accordance with the present invention.

An embodiment of a video segment decoder 74 in accordance with the present invention is illustrated by the block diagram in FIG. 3. The decoder provides a system for reconstructing a video image from a bit stream 67 representative of an encoded video signal received from a corresponding encoder 44. The bit stream 67 enters an inverse variable length coder 76, or a like inverse entropy coder, which decompresses the bit stream. The decompressed bit stream is applied to a demultiplexer 78 which extracts a symbolic code, the code for unrecognized data and a motion compensation signal. In a preferred embodiment, the demultiplexer 78 includes a synchronizer which generates an internal clock signal in order to lock onto the bit stream.

The extracted symbolic code, code for the unrecognized signal, and motion compensation signal are applied to an object generator 80. The object generator 80 includes a generic object decoder 82 and a generic object library 84 coupled thereto. The generic object library 84, which contains the waveforms for a set of generic objects and corresponding symbolic identification codes, that correspond to the content of library 52, is preferably embodied by an electronic storage device such as a EEPROM of the receiver 13. The generic object decoder 80 acts to generate a signal representing a generic object in the generic object library 84 that was represented by the extracted symbolic code. The generic object library 84 is updated upon receiving, within the bit stream, new objects which were unrecognized in the segment encoder 44. Hence, new objects added to the generic library 22 are also added to the generic object library 84 on a timely basis.

The extracted motion compensation signal is applied to a motion compensator 86. The motion compensator 86 modifies a location of the generated object in dependence upon the motion compensation signal.

The output of the object generator 80 is applied to an inverse transform coder 88. The inverse transform coder 88 performs an inverse of the coding operation performed by the mapper 42. The output of the inverse transform coder 88 provides a reconstructed video signal. In a preferred embodiment, the reconstructed video signal is in the form of a digital video bit stream.

In accordance with the present invention, the segment decoder 74 reconstructs a video image from an encoded video signal first extracts a symbolic code from the encoded video signal, wherein the symbolic code identifies a corresponding generic object from a predetermined set of generic objects. In addition, the segment decoder 74 extracts a motion compensation signal from the encoded video signal and generates the video image signal reconstructed from generic objects, the code for unrecognized objects, and the location modifications of the objects in dependence upon the motion compensation signal.

The vocal audio signal is applied to a speech segment 90 including an encoder 92 which forms an encoded vocal signal. Similarly, an audio signal is applied to an audio segment 140 including a segment encoder 142 which forms an encoded nonvocal signal. A multiplexer, for example, the multiplexer 54, which is coupled to encoder 40, encoder 92 and the encoder 142, forms the bit stream by multiplexing the encoded signal.

Upon entering the encoder 92, the vocal audio signal is applied to an analog-to-digital converter 94. The analog-to-digital converter 94 digitizes the vocal signal to form a digital vocal signal. If the vocal signal is already in a digital form, the analog-to-digital converter 92 is not required. A phoneme parser 96 is coupled to the analog-to-digital converter 94. The phoneme parser 22 identifies the time base for each phoneme contained within the digital vocal signal, and parses the digital vocal signal into at least one phoneme based upon the time base.

The phoneme parser 96 is coupled to a phoneme recognizer 98 which recognizes the at least one phoneme from a predetermined phoneme set in the phoneme library 100 of segment 90, and assigns a symbolic code to each of the at least one phoneme. In a preferred embodiment, the phoneme recognizer 98 assigns a unique six-bit symbolic code to each of the approximately forty phonemes in the English language. However, the number of bits needed for coding the phonemes is dependent upon the number of phonemes in the language of interest. In order to allow encoding of vocal audio which results from singing, the predetermined phoneme set may also include singing phonemes.

The symbolic code for recognized phonemes and the unrecognized data from the phoneme recognizer 98 are applied to a variable length coder 102. The variable length coder 102 provides a variable length code of the symbolic code based upon the relative likelihood of the corresponding phoneme to be spoken. More specifically, phonemes which occur frequently in typical speech are coded with shorter length codes, while phonemes which occur infrequently are coded with longer length codes. The variable length coder 102 is employed to reduce the average number of bits needed to represent a typical speech signal. In a preferred embodiment, the variable length coder is coupled to a multiplexer 104 which formats the variable length code into a serial bit stream.

Figure 4:
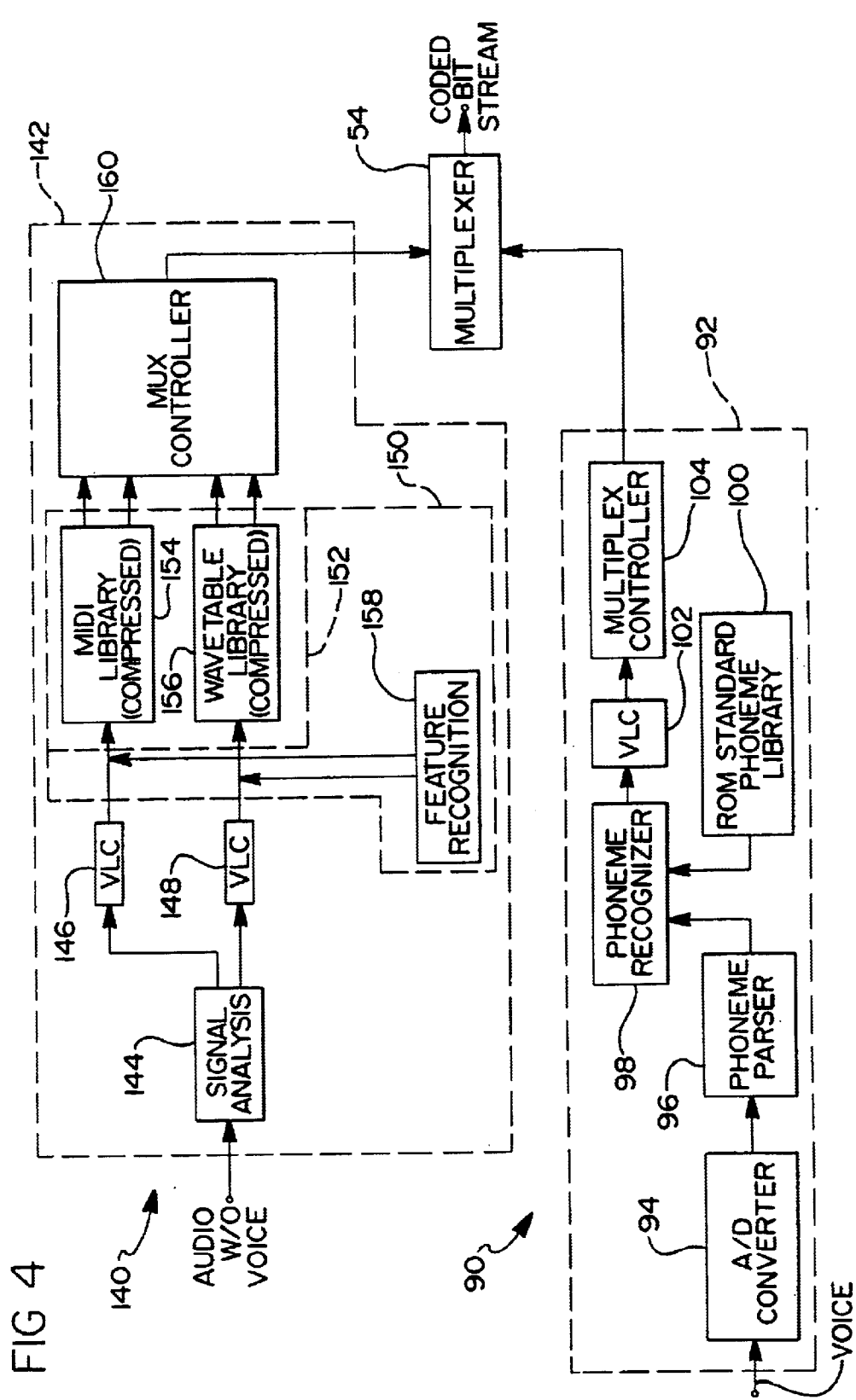
FIG. 4 is a block diagram of encoder segments including libraries with segment elements for symbolic representation of aural content information in the system of FIG. 1.

The audio segment 140 includes audio encoder 142 and a signal analyzer 144 which decompose the nonvocal audio signal into a plurality of decomposed signals based upon a corresponding plurality of predetermined signal classes. If the nonvocal audio signal is an analog signal, the signal analyzer 144 can include an analog-to-digital converter in order to provide a digital bit steam for further processing therewithin. In the embodiment of FIG. 4, two predetermined signal classes are defined: a MIDI class and a wavetable class. As such, the nonvocal audio signal segment is segregated into a MIDI bit stream and a wavetable bit stream, in dependence upon the type of sound in the nonvocal audio signal and the application. In some applications, it is not necessary to decompose the nonvocal audio signal. For instance, the nonvocal audio signal may be in the form of music generated by an instrument which directly produces a MIDI file. In these applications, the decomposed signals are directly applied to the second encoder 142 without having to employ the signal analyzer 144.

Optionally, each bit stream is applied to a corresponding variable length coder (VLC) 146 and 148, respectively. Each VLC provides a variable length code that reduces the average number of bits needed to represent each bit stream.

The variable length coders 146 and 148 are coupled to a feature recognizer 150. The feature recognizer 150 produces at least one symbolically coded identifier in dependence upon the nonvocal audio signal, and outputs the encoded nonvocal symbolic signal based upon the at least one coded identifier. The feature recognizer 150 includes at least one library 152 of prestored sound elements, and a symbolically coded identifier is representative of each sound element.

In the embodiment of FIG. 4, the feature recognizer 150 includes a MIDI library segment 154 which contains MIDI sound elements, and a wavetable library 156 which contains wavetable sound elements. Each sound in the MIDI bit stream is compared by a feature recognition subsystem 158 to the MIDI sound elements in the MIDI library 154. The closest element in the MIDI library segment 154 is selected, and a symbolically coded identifier of this MIDI element is obtained. Similarly, each sound in the wavetable bit stream is compared to the wavetable sound elements in the wavetable library 156. The closest element in the wavetable library is selected, and a coded identifier of this wavetable element is obtained. Various metrics of correlation can be employed for determining the closest element.

The feature recognizer 150 includes a variable length coder for the MIDI and wavetable identifiers for application to a multiplexer 160. The multiplexer 160 multiplexes each of the symbolically coded identifiers, the codes for the unrecognized signal portions, and timing information to produce the encoded nonvocal signal. In a preferred embodiment, the encoded non-vocal signal is in the form of a serial bit stream. The output of the second encoder 12 is applied to the multiplexer 14, as is the output of the first encoder 10, to provide a combined coded output for transmission to a corresponding decoder.

Each of the multiplexers 104, 160 and 54 may include a corresponding buffer to store a portion of a bit stream. This allows for management of the output bit stream subject to varying conditions on the input bit streams. Preferably, a reference clock is employed with presentation time stamps to align the input and the output of the multiplexers.

Figure 5:
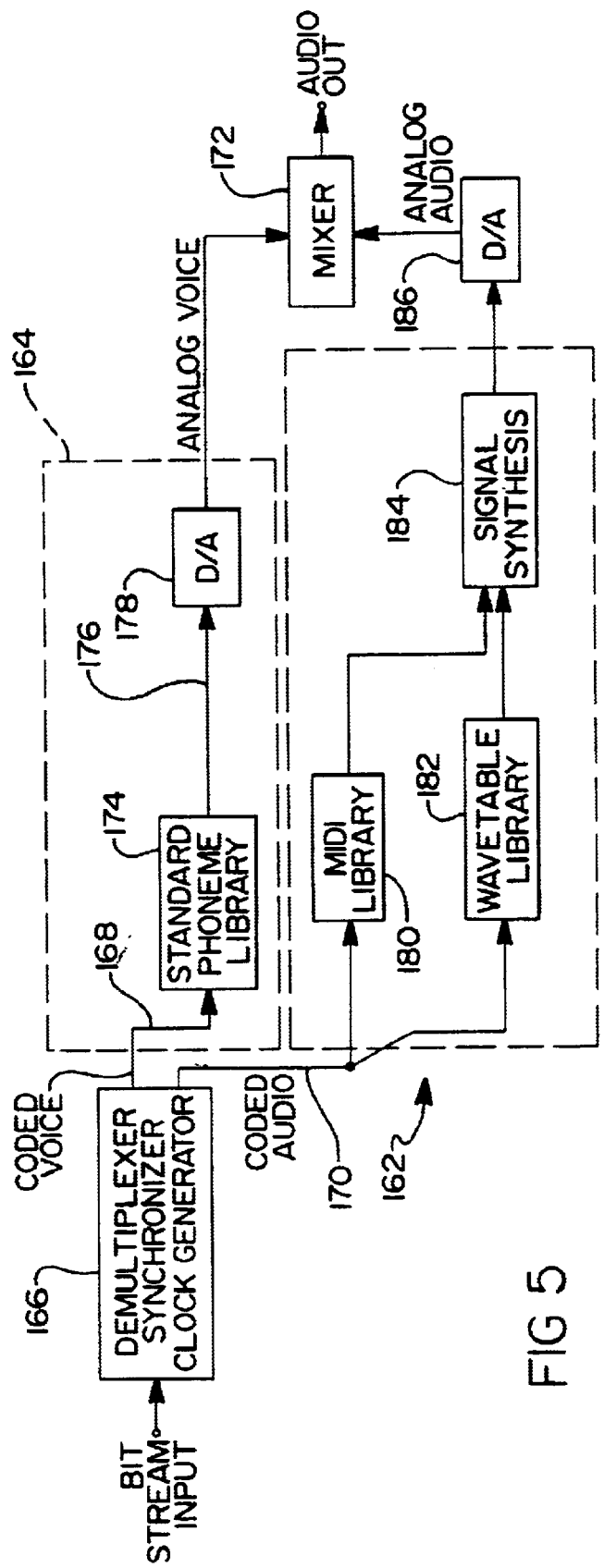
FIG. 5 is a block diagram of an embodiment of segment decoders for the aural content information encoded in encoder segments of FIG. 4.

In accordance with the present invention, an embodiment of a decoder/receiver for each segment 90 and 140 is illustrated by the block diagram in FIG. 5. The music segment decoder 162 and the speech segment decoder 164 provide a system for recreating a audio signals from a bit stream representative of an encoded audio signal received from a corresponding encoder 140 and 90, respectively. The bit stream enters a demultiplexer 166, which recovers a reference clock signal and generates an internal clock signal in order to phase lock onto the bit stream. The demultiplexer 166 is capable of performing a demultiplexing operation wherein an encoded vocal signal and an encoded music or nonvocal signal are extracted from the bit stream. In a preferred embodiment, the demultiplexer 166 decodes a transport layer which provides presentation time stamps, and segregates the incoming bit stream into an encoded vocal bit stream 168 and an encoded nonvocal bit stream 170 which are decompressed.

An audio mixer 172 is coupled to the first decoder 82 and the second decoder 84 to combine the decoded vocal signal and the decoded nonvocal signal, thus producing the recreated audio signal.

The demultiplexer 166 is further capable of extracting at least one symbolic code as well as the code for unrecognized data from the bit stream, so that decoder 164 receives the at least one symbolic code representative of a corresponding phoneme from a predetermined phoneme set in library 174 that corresponds to the library 100 in encoder 92. Each such library includes waveforms for each international phoneme set as well as a dictionary for transforming ASCII characters to speech. In a predetermined embodiment for English, the demultiplexer 166 blocks the encoded vocal bit stream into six-bit blocks, each representing a phoneme. The at least one symbolic code is applied to a standard phoneme waveform generator associated with the library 174 within the first decoder 164. The standard phoneme waveform generator generates a corresponding phoneme waveform from the standard waveform set for each of the at least one symbolic code. As a result, a recreated speech signal containing phonemes and the code for unrecognized data, typically represented digitally at 176, is formed.

The analog recreated speech from the convertor 178 signal forms the decoded vocal signal which is applied to the audio mixer 172.

An embodiment of the decoder 162 extracts the encoded nonvocal signal 170 from the demultiplexer 80 that includes a plurality of symbolic encoded signals based upon the plurality of predetermined signal classes such as a MIDI library 180 and a wavetable library 182 corresponding to the libraries 154 and 156, respectively, in the encoder 140. Each such library preferably includes waveforms for notes of various musical instruments as well as waveforms for discrete sounds such as bell ringing, animal noises, chimes, telephone ringing and other selected reproductions.

The MIDI encoded signal is applied to a MIDI symbolic decoder 100 which contains a library of MIDI sound elements. The MIDI symbolic library 180 includes a decompressor that generates at least one of the MIDI sound elements in response to receiving the MIDI encoded signal. Similarly, the wavetable encoded signal is applied to wavetable library 182 with a wavetable symbolic decoder for generating wavetable sound elements. The wavetable decoder generates at least one of the wavetable sound elements in response to receiving the wavetable encoded signal. The library 180 corresponds to the library 154 while the library 182 has content corresponding to the objects in library 156.

A signal synthesizer 184 is coupled to the MIDI symbolic library and the wavetable symbolic library to construct the nonvocal audio signal based upon the generated sound elements prior to the addition of the vocal audio in the mixer 172. The signal synthesizer 184 constructs the nonvocal audio signal based upon timing information provided by time stamps and other descriptive information. The output of the signal synthesizer 184 is applied to a digital-to-analog convertor 186, which provides an analog nonvocal audio signal for application to the audio mixer 172. The audio mixer 172 combines the vocal and nonvocal audio signals for presentation to the user.

In an alternative embodiment, the digital-to-analog converters 178 and 186 are eliminated. The mixed digital signal produced by the audio mixer 172 can be converted to analog by a digital-to-analog converter coupled to the output of the audio mixer 172. However, the step of converting the mixed signal to an analog form is optional.

Similar encoder and decoder branches may be employed in processing information signals related to graphics. In such an instance, the encoder and the decoder will include the corresponding library contents. The library content may include a text to video text generator, geometric primitives, a scrolling text engine and CAD/Postscript features for symbolically encoding and decoding objects contained in the information signals delivered to the encoder and the decoder.

It should be noted that the present invention may be used in a wide variety of different constructions encompassing many alternatives, modifications, and variations which are apparent to those with ordinary skill in the art. Accordingly, the present invention is intended to embrace all such alternatives, modifications, and variations as fall within the spirit and broad scope of the appended claims.

What is claimed is:

1. A system for transferring a data signal including a transmitter having an encoder and a receiver having a decoder, comprising:

said encoder including a object selector for identifying a signal segment from the group of speech, audio, video and graphic signals, each selected segment comprising a representation of an information quantity;

wherein said encoder includes a plurality of encoder libraries, one of said libraries containing an a priori generic feature representation of an information quantity and a symbolic code corresponding to said a priori generic feature representation of said information quantity; and said decoder having a second plurality of libraries corresponding to said plurality of encoder libraries, and one of said decoder libraries containing said a priori generic feature representation of said information quantity and said symbolic code corresponding to said a priori generic feature representation of information quantity.

2. A system for encoding a signal into a bit stream, the signal representative of data including data representing at least one a priori generic object in at least one frame, the system comprising:

an object selector for selecting feature quantities of a data information signal from aural or visual information signals that relate closely to said at least one a priori generic object;

an object encoder with an object library, said library assigning a symbolic code to said at least one a priori generic object contained in the at least one object frame, wherein the symbolic code identifies said at least one a priori generic object from a set of generic objects in said library;

an unrecognized signal portion input to the object encoder; and a multiplexer which provides a bit stream based upon combining the unrecognized signal portion input and the symbolic code identifying said a priori generic object.

3. The system of claim 2 wherein the library includes a first storage device which contains the set of generic objects.

4. The system of claim 3 wherein the object encoder stores an unrecognized object in the first storage device.

5. The system of claim 2 wherein the object encoder includes a visual image segmenter which segments the at least one video image frame into at least one object.

6. The system of claim 2 wherein the object encoder includes a feature extractor which forms at least one feature quantity for the object.

7. The system of claim 6 wherein the object encoder includes a classifier, coupled to the feature extractor, which determines the corresponding generic object based upon the at least one feature quantity.

8. The system of claim 2 further comprising a mapper which forms a transformed signal in dependence upon the video signal, and provides the transformed signal to the object encoder.

9. The system of claim 2 further comprising a variable length coder, coupled to the multiplexer, which provides a variable length coding of the bit stream.

10. The system of claim 2 further comprising a motion estimator which performs a comparison of a first video frame to a second video frame, and provides a representation of the comparison to the multiplexer.

11. A method of encoding a signal representative of a sequence of at least one feature from an aural or visual signal representation into a bit stream, the method comprising the steps of:

segmenting said sequence into generic objects and unrecognized features;

assigning a symbolic code to a generic object contained in the at least one feature, wherein the symbolic code identifies a corresponding generic object from a set of a priori generic objects; and multiplexing the unrecognized features signal and the symbolic code to said a priori generic object to form the bit stream.

12. A system for reconstructing an information sequence with at least one feature from a bit stream representative of an encoded signal having symbolic codes that represent generic objects and code for unrecognized information, the system comprising:

a demultiplexer which extracts said symbolic code and said code for unrecognized information from the encoded video signal, wherein the symbolic code identifies a corresponding generic object from a set of a priori generic objects; and an object generator, coupled to the demultiplexer, which forms the sequence by generating the corresponding a priori generic object identified by the symbolic code, and reconstructing the information sequence from a generic object and said code for unrecognized information.

13. A method of reconstructing an information sequence from a bit stream with at least one symbol of a sequence of at least one generic object from an aural or visual signal segment and a coded representation of unrecognized features, the method comprising the steps of:

extracting a symbolic code for said at least one generic object and an unrecognized information portion from the signal, wherein the symbolic code identifies a corresponding generic object from a set of a priori generic objects in a library;

generating the corresponding a priori generic object from a corresponding a priori generic object library in dependence upon the symbolic code; and generating a sequence of at least one combined feature from the generic object and said unrecognized information portion.

\* \* \* \* \*